United States Patent [19]
Laue et al.

[11] Patent Number: 5,929,294
[45] Date of Patent: Jul. 27, 1999

[54] EASILY TRANSPORTABLE AND METERABLE MIXTURES OF AROMATIC OILS AND PHENYLENEDIAMINES HAVING HIGH STABILITY IN STORAGE

[75] Inventors: Christian Laue, Monheim; Reinhard Preuss, Oldendorf; Lothar Ruetz, Dormagen, all of Germany

[73] Assignee: Bayer AG, Germany

[21] Appl. No.: 08/931,120

[22] Filed: Sep. 16, 1997

[30] Foreign Application Priority Data

Sep. 23, 1996 [DE] Germany ............... 196 38 892

[51] Int. Cl.$^6$ .......... C07C 7/20; C10M 105/02; C10M 111/00; C10M 115/02
[52] U.S. Cl. ...................................................... 585/5
[58] Field of Search .................................... 585/5

[56] References Cited

U.S. PATENT DOCUMENTS

| | | | |
|---|---|---|---|
| 4,062,797 | 12/1977 | Behrens | 252/182 |
| 4,092,375 | 5/1978 | Vreugdenhil | 260/876 B |
| 4,551,391 | 11/1985 | Kang et al. | 428/462 |
| 4,866,138 | 9/1989 | Chasar | 525/330.9 |
| 5,328,953 | 7/1994 | Lynch | 525/332.7 |

FOREIGN PATENT DOCUMENTS

| | | |
|---|---|---|
| 654498 | 11/1994 | European Pat. Off. . |
| 962113 | 6/1964 | United Kingdom . |
| 1172596 | 12/1969 | United Kingdom . |

OTHER PUBLICATIONS

Hofmann, Rubber Technology Handbook, Houser Publishers, 1989, pp. 268–273.

H. Magg et al., "Modern Lieferformen von Kautschuk–Chemikalien", pp. 1039–1046.

*Primary Examiner*—Nathan M. Nutter
*Attorney, Agent, or Firm*—Connolly & Hutz

[57] ABSTRACT

This invention relates to easily conveyable and easily meterable mixtures having high stability in storage, containing aromatic mineral oils and phenylenediamines, the content of phenylenediamines in the mixture being 1 to 99 wt. %. The mixtures of mineral oils and phenylenediamines according to the invention are used in the production of rubbers and rubber articles.

9 Claims, No Drawings

EASILY TRANSPORTABLE AND METERABLE MIXTURES OF AROMATIC OILS AND PHENYLENEDIAMINES HAVING HIGH STABILITY IN STORAGE

BACKGROUND OF THE INVENTION

1. Field of the Invention

The present invention relates to easily conveyable and easily meterable mixtures of aromatic oils and phenylenediamines having high stability in storage as well as the use thereof in the production of rubbers and rubber articles.

2. Description of the Prior Art

The use of phenylenediamines in the production of rubbers and rubber articles is known (see Hofmann, Rubber Technology Handbook, Houser Publishers, 1989, page 268 ff.). The phenylenediamines to be used for the rubber application, which are in the form of solids or viscous melts at room temperature, are generally sold, stored, metered and transported in the form of solids at room temperature or in the form of liquid melts at more elevated temperatures (up to 100° C.). Handling these substances in the form of a liquid melt has the advantage over handling in granular form that melts are dust-free, have a higher density than that of a bed of granules, are capable of being pumped and can therefore be mixed and metered more efficiently.

A disadvantage of handling phenylenediamines in the form of low-viscosity melts is the energy consumption and the technical expense which are necessary for the transport and storage of the hot melt. Especially during metering and passage to the mixing apparatus, it is necessary to heat the entire system of ducts because the product instantly crystallises out on being cooled to below the melting temperature and consequently clogs the ducts.

The use of aromatic mineral oils in the production of rubbers and rubber articles is also known (see Hofmann, Rubber Technology Handbook, Houser Publishers, 1989, page 296 ff.).

The aromatic oils used in the process are generally highly viscous and, in order to lower the viscosity, they are often stored, metered and admixed to the rubber-mixtures at elevated temperatures.

It was accordingly the object of the present invention to provide the aromatic oils and the phenylenediamines in an easily transportable and easily meterable form which moreover has a high stability in storage.

This object was fulfilled by the provision of the mixtures of aromatic oils and phenylenediamines according to the invention.

SUMMARY OF THE INVENTION

The present invention accordingly provides easily transportable and easily meterable mixtures having high stability in storage, containing a) aromatic mineral oils and b) phenylenediamines corresponding to the formula

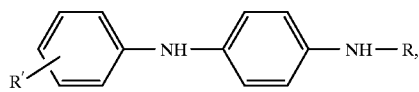

wherein

R represents an aliphatic $C_1$–$C_{10}$ hydrocarbon group or a phenyl group optionally substituted with $C_1$–$C_4$ hydrocarbon groups and R' represents hydrogen or an aliphatic $C_1$–$C_4$ hydrocarbon group, the content of phenylenediamines in the mixture amounting to 1 to 99 wt. %.

DESCRIPTION OF THE PREFERRED EMBODIMENTS

Aromatic mineral oils which are suitable for the mixtures according to the invention are in particular those having a viscosity-gravity constant of from 0.001 to 1.10, of the type described in Hofmann, Rubber Technology Handbook, Houser Publishers, 1989, pages 296 and 297. Mineral oils having viscosity-gravity constants of from 0.93 to 1.00 are preferably used.

Examples of suitable types of mineral oils are listed in Table 1.

TABLE 1

| Name | Supplier | Viscosity-gravity constant |
|---|---|---|
| Sundex 790 | Sun Oil | 901 |
| Ingralen 9290 | Fuchs | 903 |
| Plasticising oil 9215 | Fuchs | 905 |
| Dutrex 726 | Shell Chem. | 916 |
| Dutrex 916 | Shell Chem. | 921 |
| Ingralen 300 | Fuchs | 922 |
| Ingralen 450 (N) | Fuchs | 924 |
| Renopal 450 | Fuchs | |
| Tudalen 370 | Dahleke | 926 |
| Sundex 8180 | Sun Oil | 928 |
| Nuso 250 | Esso | 928 |
| Ingralen 150 | Fuchs | 929 |
| Ingralen 90 | Fuchs | 930 |
| Ingralen 300 | Fuchs | 933 |
| Sundex 890 | Sun Oil | 936 |
| Dutrex 1786 | Shell Chem. | 937 |
| Polymerol 6040 | D. Shell | 937 |
| Dutrex 6 H | Shell Chem. | 943 |
| Dutrex 1786 | Shell Chem. | 945 |
| Tudalen 85 | Dahlke | 946 |
| Sundex 8125 | Sun Oil | 949 |
| Dutrex R | Shell Int. | 949 |
| BP Olex RM 35 A | BP | 950 |
| Ingralen 450 | Fuchs | 953 |
| Plasticiser E 2 | Ulitzsch | 954 |
| Dutrex 757 | Shell Chem. | 955 |
| Naftolen ZD | Metallgesellschaft | 956 |
| Plasticiser E 1 | Ulitzsch | 957 |
| Nuso 500 | Ess | 957 |
| Polymerol 6039 | D. Shell | 963 |
| Dealen R 2 | DEA | 964 |
| Naftolen NV | Metallgesellschaft | 964 |
| Plasticiser 9230 | Fuchs | 966 |
| Plasticiser oill K | Fuchs | 970 |
| BP Olex RM 30 | BP | 971 |
| Nuso 40 | Esso | 975 |
| Naftolen H | Metallgesellschaft | 977 |
| Exarol 20 | Brenntag | 980 |
| Ingralen 50 | Fuchs | 983 |
| Dutrex 25 | Shell Chem. | 983 |
| Naftolen MV | Metallgesellschaft | 988 |
| Ingralen 20 | Fuchs | 990 |

Suitable phenylenediamines corresponding to the above formula are in particular those wherein R represents a methyl, ethyl, isopropyl, 4-methyl-2-pent-2-yl, 5-methylhex-2-yl, propyl, butyl, hexyl group or a phenyl group or tolyl group. Representatives of R' which may be particularly mentioned are hydrogen and the methyl group.

The following phenyldiamines are particularly preferred:
N-(1,3-dimethylbutyl)-N'-phenyl-p-phenylenediamine (6-PPD), N-(isopropyl)-N'-phenyl-p-phenylenediamine,
N,N'-diphenyl-p-phenylenediamine,
N,N'-ditolyl-p-phenylenediamine and
N'-phenyl-N'-tolyl-p-phenylenediamine,
or mixtures of these compounds.

The phenylenediamines and the aromatic oils may be used either separately or as mixtures with one another.

Depending on the intended use, it may be advantageous to use mixtures according to the invention which contain from 1 to 20 wt. %, from 20 to 70 wt. % or from 70 to 99 wt. % of phenylenediamine in the aromatic oil.

Thus a lowering of the viscosity of the aromatic oil is attained by the admixture of about 1 to 20 wt. % phenylenediamine to the aromatic oils. For example, a lowering of the viscosity of the aromatic oil of 50% is attained on admixing 10% of phenylenediamines corresponding to the above formula. A comparable lowering of the viscosity of the aromatic oil without the addition of phenylenediamines is attained only at a temperature of about 15° C. higher.

Solutions of phenylenediamine in the aromatic oil which are saturated at room temperature (20 to 80% phenylenediamine solution) can be transferred in liquid form to another vessel, transported, metered and stored and, in contrast to the pure melts, require no heating. The risk of clogging of the ducts in the event of local overcooling of heated melts is also avoided. The solubility in aromatic oils of phenylenediamines corresponding to the general formula (I) is surprising because, for example, 6-PPD does not dissolve appreciably in other plasticising oils conventionally used in the rubber industry; this is illustrated in Example 3.

Surprisingly, if about 10% of one of the above-mentioned aromatic oils is admixed to the phenylenediamine melts (99 to 80 wt. % phenylenediamine), the stability of the overcooled melts is increased. Thus, for example, a melt of 6-PPD rapidly cooled to room temperature crystallises out in about 5 to 10 minutes, whereas the addition of 10% of an aromatic oil to the phenylenediamines prolongs their crystallisation times to about 5 to 7 days.

EXAMPLE 1

This experiment is intended to show that an admixture of an aromatic oil increases the stability of overcooled melts of PPDs.

The mixtures shown in Table 2 were weighed out. Homogeneous solutions were prepared by heating to 80° C. The solutions were then cooled to RT within 3 minutes and the period of time taken for crystals to appear was observed.

TABLE 2

| % 6-PPD in Renopal ® 450 | Period of time up to crystallisation |
| --- | --- |
| 100% | 10 minutes |
| 90% | 5 to 7 days |
| 80% | 9 days |
| 70% | 9 to 14 days |
| 60% | 9 to 14 days |
| 50% | 9 to 14 days |
| 40% | 9 to 14 days |

Comparable effects can be obtained using the mineral oils Naftolen H, Naftolen NV, Naftolen ZD, Exarol oil 20 and Enerflex 656 (Exarol oil)

EXAMPLE 2

This experiment shows the lowering of the viscosity of the aromatic oil Renopal® 450 by the addition of 10% 6-PPD (Table 3).

TABLE 3

|  | Renopal ® 450 | +10% 6-PDD |
| --- | --- | --- |
| 21° C. | 18,000 | 7,100 [mPas] |
| 40° C. | 1,400 | 750 |
| 60° C. | 320 | 170 |
| 80° C. | 90 | 44 |

Renopal ® is a product of the firm Fuchs (Mannheim) having the following physical data:
Viscosity-gravity constant: 0.950

EXAMPLE 3

25% solutions of 6-PPD in Renopal® 450 are prepared at room temperature. Comparison experiment: 6-PPD shows no appreciable solubility in the following plasticising oils used in the rubber industry:

Adimoll DO=dioctyl adipate, Bayer AG, Dormagen
Mesamoll=alkylsulphonic ester of phenol, Bayer AG, Dormagen
Ecubsol oil=alkylate, UK mineral oil plant Wenzel and Weidmann, Eschweiler
Exarol oil=from the firm Brenntag

What is claimed is:

1. An easily transportable and easily meterable mixture having high stability in storage, consisting essentially of:
   a) an aromatic mineral oil and
   b) a phenylenediamine corresponding to the formula:

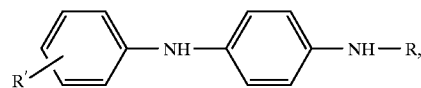

wherein
   R represents an aliphatic $C_1$–$C_{10}$ hydrocarbon group or a phenyl group optionally substituted with a $C_1$–$C_4$ hydrocarbon group
and
   R' represents hydrogen or an aliphatic $C_1$–$C_4$ hydrocarbon group,
   the content of the phenylenediamine in the mixture amounting to 1 to 99 wt. %.

2. The mixture according to claim 1, containing from 1 to 20 wt. % of the phenylenediamine.

3. The mixture according to claim 1, wherein the aromatic mineral oil has a viscosity-gravity constant of from 0.0001 to 1.10.

4. The mixture according to claim 3, wherein the viscosity-gravity constant is from 0.93 to 1.00.

5. The mixture according to claim 1, wherein R is a methyl, ethyl, isopropyl, 4-methyl-2-pent-2-yl, 5-methylhex-2-yl, propyl, butyl, hexyl, phenyl or tolyl group.

6. The mixture according to claim 1, wherein R' is H or a methyl group.

7. The mixture according to claim 1, wherein the phenylenediamine is N-(1,3-dimethylbutyl)-N'-phenyl-p-phenylenediamine, N-(isopropyl)-N'-phenyl-p-phenylenediamine, N,N'-diphenyl-p-phenylenediamine, N,N'-ditolyl-p-phenylenediamine, N'-phenyl-N'-tolyl-p-phenylenediamine or a mixture thereof.

8. A transportable and meterable mixture having stability in storage, comprising:
   a) an aromatic mineral oil and
   b) 20 to 70 wt. % of a phenylenediamine corresponding to the formula:

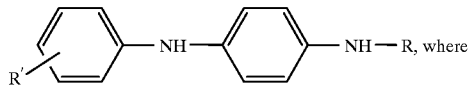

R represents an aliphatic $C_1$–$C_{10}$ hydrocarbon group or a phenyl group optionally substituted with a $C_1$–$C_4$ hydrocarbon group
   and
   R' represents hydrocarbon or an aliphatic $C_1$–$C_4$ hydrocarbon group.

9. A transportable and meterable mixable having stability in storage, comprising:
   a) an aromatic mineral oil and
   b) 70 to 99 wt. % of a phenylenediamine corresponding to the formula:

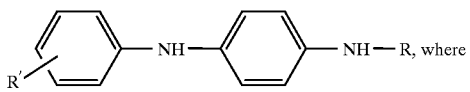

R represents an aliphatic C1–C10 hydrocarbon group or a phenyl group optionally substituted with $C_1$–$C_4$ hydrocarbon group
   and
   R' represents hydrocarbon or an aliphatic $C_1$–$C_4$ hydrocarbon group.

* * * * *